United States Patent
Tuhro et al.

(10) Patent No.: US 10,220,824 B2
(45) Date of Patent: Mar. 5, 2019

(54) ELECTRONIC BRAKE SUPPORT SYSTEM FOR USE WHEN SERVICE BRAKE SYSTEM HAS FAILED OR IS DEGRADED

(71) Applicant: Continental Automotive Systems, Inc., Auburn Hills, MI (US)

(72) Inventors: Matthew C. Tuhro, Sault Ste. Marie, MI (US); Bryan S. Coullard, Pickford, MI (US); Daniel G. Goodrich, Cedarville, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/495,939

(22) Filed: Sep. 25, 2014

(65) Prior Publication Data
US 2016/0090071 A1    Mar. 31, 2016

(51) Int. Cl.
*B60T 17/22*    (2006.01)
*B60T 7/12*    (2006.01)
*B60T 8/88*    (2006.01)
*B60T 8/172*    (2006.01)

(52) U.S. Cl.
CPC .............. *B60T 17/22* (2013.01); *B60T 7/12* (2013.01); *B60T 8/172* (2013.01); *B60T 8/88* (2013.01)

(58) Field of Classification Search
None
See application file for complete search history.

(56) References Cited

U.S. PATENT DOCUMENTS

| | | | | |
|---|---|---|---|---|
| 6,702,405 B1 * | 3/2004 | Balz | ........................ | B60T 7/107 303/192 |
| 8,606,477 B2 | 12/2013 | Stan | | |
| 2002/0113488 A1 * | 8/2002 | Harris | ..................... | B60T 7/042 303/113.1 |
| 2008/0238189 A1 * | 10/2008 | Kuo | ....................... | B60T 8/442 303/114.3 |
| 2009/0195058 A1 | 8/2009 | Jackson et al. | | |
| 2010/0090522 A1 | 4/2010 | Bensch et al. | | |
| 2010/0314934 A1 | 12/2010 | Leiter | | |

(Continued)

FOREIGN PATENT DOCUMENTS

EP    1438102 A1    7/2004
GB    2349676 A    11/2000
(Continued)

OTHER PUBLICATIONS 15186840.3 European Patent Office Search Report dated Jan. 22, 2016.

*Primary Examiner* — Rami Khatib
*Assistant Examiner* — Gerrad A Foster

(57) ABSTRACT

An electronic parking brake support system for a vehicle includes an electric parking brake having at least one brake member associated with a wheel of the vehicle. The system also includes a service brake system constructed and arranged to control service brakes of the vehicle. The service brake system includes at least one circuit constructed and arranged to determine an occurrence of a failure or degradation condition of the service brake system and, in response to the detected condition, to send a request signal to the electric parking brake instructing the electric parking brake to activate the at least one brake member.

17 Claims, 1 Drawing Sheet

(56) References Cited

U.S. PATENT DOCUMENTS

| | | | |
|---|---|---|---|
| 2013/0103267 A1* | 4/2013 | DeWitt | B60T 1/10 |
| | | | 701/50 |
| 2014/0054118 A1 | 2/2014 | Rogers et al. | |
| 2014/0110999 A1 | 4/2014 | Eberling et al. | |
| 2016/0214595 A1* | 7/2016 | Baehrle-Miller | B60T 7/22 |

FOREIGN PATENT DOCUMENTS

| | | |
|---|---|---|
| JP | 2013071521 A | 4/2013 |
| JP | 2013086797 A | 5/2013 |

\* cited by examiner

ELECTRONIC BRAKE SUPPORT SYSTEM FOR USE WHEN SERVICE BRAKE SYSTEM HAS FAILED OR IS DEGRADED

FIELD

The invention relates to vehicles with service brakes and, more particularly, to an electronic parking brake support system that can be used to provide brake torque when the service brake system has failed or is degraded.

BACKGROUND

Service brake systems degrade and fail. Vehicles with these degradations and failures must meet minimum performance requirements established by Original Equipment (OE) manufacturers and legal entities, such as the United States (US) Government and Commission of the European Communities (ECE). The US Federal Motor Vehicle Safety Standard (FMVSS) 135 outlines several minimum vehicle performance requirements, including the following as examples:
  Cold Effectiveness (reduced effectiveness of brake linings),
  Antilock Functional Failure (failed wheel pressure outlet valve or failed hydraulic pump in Anti-lock Brake System, ABS, hydraulic control unit),
  Hydraulic Circuit Failure (primary, secondary or both),
  Brake Power Unit or Brake Power Assist Unit Inoperative (low or no vacuum), and
  Hot Performance (reduced effectiveness brake linings).

The service brake system can be configured to provide adequate brake torque and meet minimum vehicle performance requirements. Examples include providing larger pedal ratio, higher friction linings, larger booster diameter, larger rotors, smaller master cylinder bore, etc. There are other brake torque support functions that increase brake torque to meet minimum vehicle performance requirements. Examples include an Electric Vacuum Pump (EVP) that increases brake booster vacuum and ABS/stability control pump. The above possible solutions may involve weight, packaging, durability, cost and other service brake performance and subjective brake feel characteristic compromises that are not desired.

Thus, there is a need to provide a system that provides brake torque in order to meet minimum performance requirements in the cases of degraded and failed service brakes that uses existing brake system components, does not increase weight, and does not compromise service brake performance and subjective brake feel characteristics

SUMMARY

An objective of the invention is to fulfill the need referred to above. In accordance with the principles of the present invention, this objective is obtained by an electronic parking brake support system for a vehicle that includes an electric parking brake having at least one brake member associated with a wheel of the vehicle. The system also includes a service brake system constructed and arranged to control service brakes of the vehicle. The service brake system includes at least one circuit constructed and arranged to determine an occurrence of a failure or degradation condition of the service brake system and, in response to the detected condition, to send a request signal to the electric parking brake instructing the electric parking brake to activate the at least one brake member.

In accordance with another aspect of the disclosed embodiment, a method utilizes an electric parking brake when a service brake system of a vehicle is not operating properly. The method determines whether the service brake system has degraded or has failed, and if the service brake system has degraded or has failed, activating the electric parking brake to apply brake torque to the vehicle.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXEMPLARY EMBODIMENT

Figure 1:
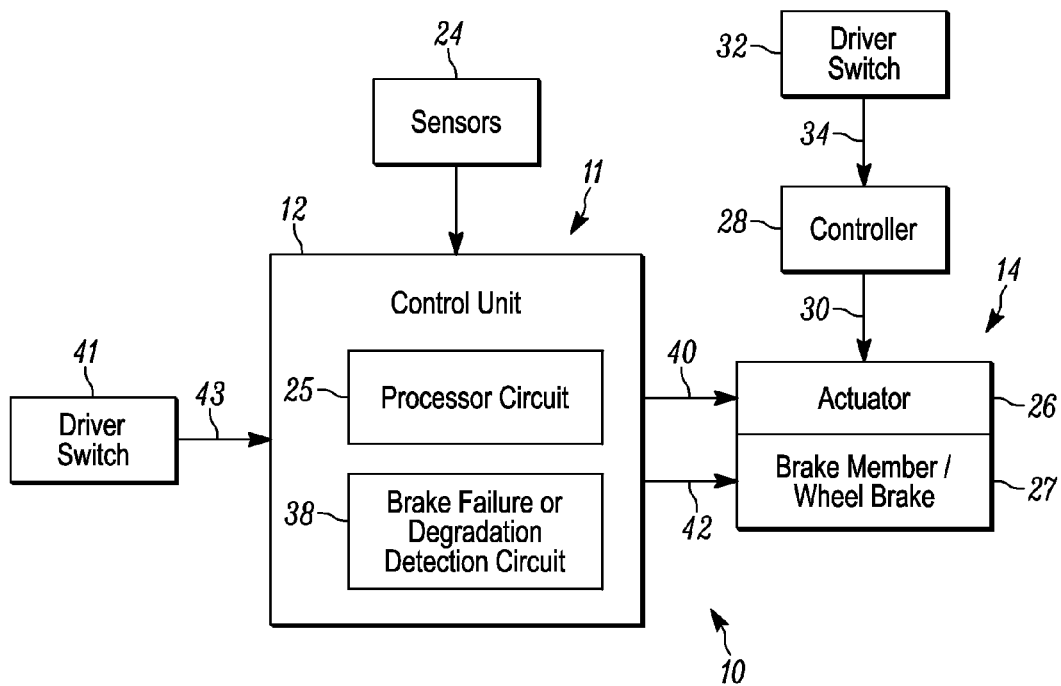
FIG. 1 is a block diagram of an electronic parking brake support system for a vehicle, with the system including a service brake system associated with an electric parking brake, in accordance with an embodiment.

With reference to FIG. 1, a block diagram of an electronic parking brake support system for a vehicle, is shown, generally indicated at 10, in accordance with an embodiment. The system 10 includes a service brake system, generally indicated at 11, including an electronic control unit (ECU) 12, such as a conventional Antilock Brake System (ABS)/stability control unit. The system 10 also includes a conventional electric parking brake (EPB), generally indicated at 14, associated with the service brake system 11.

The service brake system 11 is preferably a conventional, hydraulic brake system, but can be of any brake system, such as a brake-by-wire type brake system. The control unit 12 is associated with at least one wheel brake or service brake 27 which can be actuated by an actuator 26 that is controlled or regulated by a control device 12. In the example in FIG. 1, one wheel brake 27 having an associated actuator 26 and an associated control device 12 is shown. However, a wheel brake 27 and associated actuator 26 can be provided for each or other wheels of the vehicle. The control unit 12 is connected to the actuators(s) 26 for causing actuation of the actuator(s) 26. Based on vehicle input information from sensors 24 and requests present at the control unit 12, such as driver braking demand, demands of a slip control system (ABS: antilock system, TCS: traction control system) or driver assistance system (ESC: electronic stability control), a decision on a desired control mode is made by a processor 25 of the control unit 12 and is transmitted to actuator(s) 26 to control the wheel brake(s) 27 in the conventional manner, such as disclosed in U.S. Pat. No. 8,606,477, the content of which is hereby incorporated by reference into this specification.

The EPB 14 for a motor vehicle has, preferably for each wheel, the actuator 26 and a parking brake member 27 such as a caliper for causing braking of the wheel. A controller 28 is connected via a control line 30 to the actuators 26. In some uses of the EPB 14, the activation of a switch 32 by the driver of the vehicle sends a signal 34 to the controller 28 to cause the actuator 26 to activate of deactivate the associated brake member (e.g., caliper) 27. In other uses, the actuation of switch 41 sends signal 43 to the controller 12 to cause the actuator 26 to activate or deactivate the associated brake member 27. The EPB 14 can use an individual motor on a caliper or can be a combined cable puller type system. The motor on caliper system or any system allowing individual control is preferred as it allows independent modulation to better optimize traction and control vehicle stability.

In accordance with an embodiment, the control unit 12 includes at least one brake condition evaluation circuit such as a failure or degradation detection circuit 38 that determines whether a failure or degradation condition is occurring or has occurred regarding the service brake system 11 such as, for example, detecting a an Antilock Functional Failure such as failed wheel pressure outlet valve, a failed hydraulic pump in Antilock Brake System (ABS) or a failed hydraulic control unit; a failed hydraulic circuit (primary, secondary or both); a Brake Power Unit or Brake Power Assist Unit failure (low or no vacuum); or reduced effectiveness of brake linings (hot or cold performance). Such braking conditions can be monitored by sensors 24 and evaluated by logic of the processor circuit 25, with the circuit 38 utilizing the information evaluated by the processor circuit 25. If any of the above-mentioned conditions is determined by the circuit 38, the circuit 38 sends an electronic request signal 40 to the EPB 14 to cause the actuator 26 to actuate the brake member 27 of the EPB 14 and thus apply and modulate brake torque to the vehicle to meet the minimum performance requirements in the event of degraded or failed service brake system 11. Thus, the use of the EPB 14 in such situations optimizes available traction and maintains vehicle stability. Also, if the brake member (caliper) 27 is hydraulically operated, the control unit 12 can control the delivery of hydraulic fluid from a source to the brake member 27 via hydraulic line 42 generally simultaneously with the sending of the request signal 40.

Figure 2:
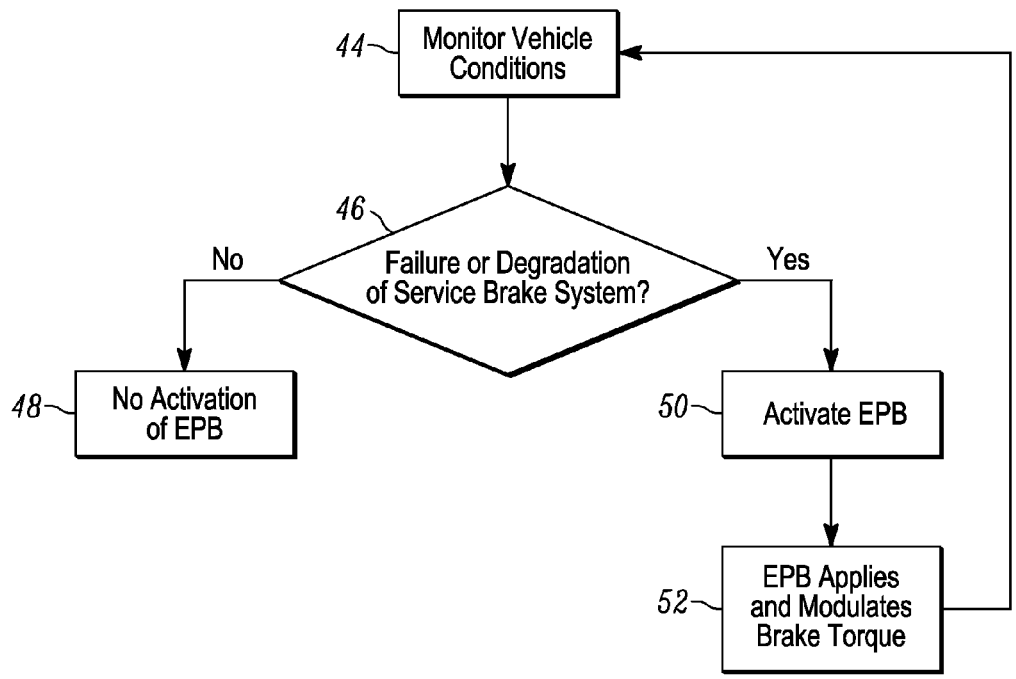
FIG. 2 is a flow diagram of operation of the system of FIG. 1.

FIG. 2 is a flowchart showing the algorithm for executing a process of an embodiment. In step 44, vehicle conditions are monitored using inputs from sensors 24 and using the circuit 38 of the control unit 12. Step 46 determines, via the circuit 38, whether a failure or degradation of the service brake system 11 has occurred or is occurring. If not, in step 48, no activation of the EPB 14 occurs. If a failure of degradation of the service brake system 11 has been determined, in step 50, the request signal 40 is sent to the actuator 26 to activate the EPB 14 and in step 52, the EPB 14 applies and modulates brake torque via the brake members 27. Modulation of the brake torque can be based on, but not limited to vehicle inputs (obtained by sensors 24) such as vehicle deceleration, master cylinder pressure, booster vacuum, wheel slip, etc.

The system 10 utilizes all existing hardware. It does not add weight. It does not require additional volume. The system 10 does not compromise service brake performance and subjective brake feel characteristics. The system 10 can also be part of a fallback, or supplemental, strategy for other additional brake torque support functions, such as ABS/stability control pump support.

Although in FIG. 1, the service brakes can include, or are associated with the parking brake members 27 of the EPB, it can be appreciated that the service brakes can be separate from the parking brake members 27. Both the parking brake members 27 and the service brakes can then be controlled by the control unit 12.

The operations described herein can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An electronic parking brake support system for a vehicle, the system comprising:
   an electric parking brake having an individually controlled brake member associated with each wheel of the vehicle, and
   a service brake system constructed and arranged to control service brakes of the vehicle, the service brake system comprising at least one circuit constructed and arranged to determine an occurrence of a degradation condition of the service brake system below a minimum performance condition regarding a braking operation and, in response to a condition determined by the at least one circuit, to send a request signal to the electric parking brake instructing the electric parking brake to activate the brake members in an independent modulated manner to apply brake torque to the vehicle to meet the minimum performance requirement, and
   wherein the brake torque from the electric parking brake is modulated based on a vehicle input including a vehicle deceleration, master cylinder pressure, or boost vacuum to optimize traction and control vehicle stability.

2. The system of claim 1, wherein the service brake system includes sensors for monitoring conditions of the vehicle, and a control unit that includes a processor circuit and at the at least one circuit, the processor circuit being constructed and arranged to evaluate information received by the sensors, with the at least one circuit being constructed and arranged to utilize the evaluated information in order to send the request signal.

3. The system of claim 2, wherein the service brake system includes an Antilock Brake System (ABS) and the at least one circuit is constructed and arranged to determine if a function of the ABS system has failed, defining the occurrence of a degradation condition.

4. The system of claim 2, wherein the service brakes are associated with the at least one brake member.

5. The system of claim 4, wherein the electric parking brake includes an actuator that is constructed and arranged to actuate the brake member, the request signal being received by the actuator.

6. The system of claim 5, wherein the brake member is a caliper.

7. The system of claim 2, wherein the at least one circuit is constructed and arranged to determine if an effectiveness of brake linings of the service brakes is reduced, defining the occurrence of a degradation condition.

8. The system of claim 2, wherein the at least one circuit is constructed and arranged to determine whether a low vacuum condition exists regarding the service brake system.

9. The system of claim 2, wherein the at least one circuit is constructed and arranged to determine if a circuit of the service brake system has failed, defining the occurrence of a degradation condition.

10. A method of utilizing an electric parking brake when a service brake system of a vehicle is not operating properly, the method comprising the steps of:

provide the electric parking brake to have an individually controlled brake member associated with each wheel of the vehicle, determining, with a detection circuit, whether the service brake system has degraded below a minimum performance requirement with regard to a braking operation, and if the service brake system has degraded, activating the brake members in an independent modulated manner, to apply brake torque to the vehicle to meet the minimum performance requirement, and modulating the brake torque based on vehicle input including at least one of vehicle deceleration, master cylinder pressure, or boost vacuum to optimize traction and control vehicle stability.

11. The method of claim 10, wherein the service brake system is an Antilock Brake System (ABS) and wherein the determining step determines if a function of the ABS system has failed.

12. The method of claim 10, wherein the determining step determines if an effectiveness of brake linings of the service brakes is reduced.

13. The method of claim 10, wherein the determining step determines if a low vacuum condition exists regarding the service brake system.

14. The method of claim 10, wherein the determining step determines if a circuit of the service brake system has failed.

15. The method of claim 10, wherein the determining step utilizes sensors and a processor circuit of the service brake system.

16. The method of claim 10, wherein the step of activating the electric parking brake includes sending a request signal from a control unit of the service brake system to the electric parking brake.

17. The method of claim 16, wherein the electric parking brake includes an actuator associated with the brake member, the actuator receiving the request signal.

* * * * *